3,231,563
HOMOPOLYMERS OF 1-ALKENYL SUBSTITUTED AZIRIDINES
Henry J. Dishburger, Lake Jackson, Tex., assignor to The Dow Chemical Company, Midland, Mich., a corporation of Delaware
No Drawing. Filed July 31, 1963, Ser. No. 299,091
3 Claims. (Cl. 260—239)

This invention relates to a novel process for making aziridines having an allylic radical attached to the ring nitrogen. It also relates to homopolymers of such N-allylaziridines.

The term aziridine is used herein to denote $\alpha,\beta$-alkylenimines having a replaceable imino hydrogen atom, for example, ethylenimine and substituted ethylenimines with one or more hydrocarbon radicals attached to the carbon atoms of the aziridine ring, these radicals including alkyl, cycloalkyl, aralkyl, and aryl radicals.

By the term allylic halide is meant a halide having the structure

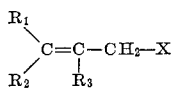

wherein $R_1$, $R_2$ and $R_3$ are independently selected from the group consisting of hydrogen and lower alkyl radicals of 1–4 carbon atoms and X is chlorine, bromine, or iodine. Halides such as allyl chloride, methallyl bromide, ethallyl iodide, 3,3-dimethylallyl chloride, 1-bromo-2-heptene, 2-propylallyl chloride and similar allylic halides are thereby included.

The general reaction of a dialkyl amine with a reactive organic halide wherein a molecule of hydrogen halide is separated and there is formed the corresponding tri-substituted nitrogen compound is well known. A wide range of conditions are suitable for carrying out the reaction successfully, including the use of either a polar or a nonpolar solvent as the reaction medium. Commonly, a dry nonpolar solvent, such as benzene, is employed. The reaction may be run using the amine reactant as the only basic substance present, in which case the amine hydrohalide is formed, or a tertiary amine such as triethylamine may be used as the acid acceptor.

However, these conditions are not generally applicable to the similar reaction of aziridines with reactive halides. For example, if no basic material other than the aziridine is present, the hydrogen halide liberated in the reaction causes opening of the aziridine ring. Bestian (Annalen 566, 210 (1950)) found that the acylation of ethylenimine with acyl chlorides in an inert solvent and in the presence of an acid acceptor was a suitable general method. On the other hand, Bestian states that the reaction of ethylenimine with reactive alkyl halides to make the corresponding N-alkyl derivatives requires particular techniques and reaction conditions in each case. He further states that the ease with which the aziridine ring is opened makes necessary the working out of a set of conditions suitable for each individual halide in order to obtain a reasonable yield of monomeric N-alkyl derivative. On this basis, it appears that no prediction can be made of favorable conditions for reaction of one halide with an aziridine from the results experienced with another halide and the possibility of a general method for such reactions seems remote.

It has now been found that an allylic halide can be reacted with an aziridine to obtain relatively good yields of the corresponding N-substituted aziridine when the reaction is carried out in a polar solvent, in the presence of an excess of a strong base, and by using at least one mole of the aziridine per mole of halide.

As the strong base and acid acceptor, there can be used any base suitable for this purpose in the general reaction of an alkyl halide with a secondary amine. The hydroxides, oxides, and alkoxides of the alkali metals and the alkaline earth metals are thereby included, as well as ammonia and such organic bases as pyridine, tetramethylguanidine, trimethylamine, triethylamine, and similar tertiary amines.

A critical condition necessary for successful operation of the process is that the reaction be carried out in a polar system. That is, rather than the nonpolar solvents such as benzene commonly used in the past in this general type of reaction, a polar solvent must be employed. Examples of this class of solvents are water, nitrobenzene, acetonitrile, dimethylformamide, the lower aliphatic alcohols such as methanol, ethanol, and isopropanol, and other solvents of similar polarity which are relatively inert to the reactants under the conditions used.

By the term polar solvent is meant a solvent having a dielectric constant of at least 5.0 as determined at 20° C. and at audio frequency. Preferred solvents have dielectric constants of at least 10.

When the aziridine is a low molecular weight aziridine with sufficient polar characteristics itself, e.g., ethylenimine, it may be used in excess as the solvent.

Similarly, an excess of a liquid tertiary amine hydrogen halide acceptor may be used as the solvent when the amine is of sufficient polar character as defined above.

It is also necessary that at least one mole of aziridine be used in the reaction mixture per mole of allylic halide. Best results are obtained when from one to about three moles of aziridine are employed. Similarly, at least one molar equivalent of base is used per mole of halide and 1.5 and 3.0 molar equivalents of base is preferred.

The reaction is conveniently run at about or slightly above room temperature, that is, in the approximate range of 20–60° C. Temperatures in the range of 0–100° C. are operable.

It is ordinarily most suitable to conduct the process under atmospheric pressure although superatmospheric pressure may be necessary when relatively high reaction temperatures are desired.

The product is ordinarily separated from the reaction mixture by filtration to remove solids and distillation of the filtrate. A second careful fractionation following an initial flash or color distillation is often the best way of obtaining a purified product.

The following examples illustrate various ways in which the process has been operated. Examples 1 and 2 are included to contrast the negative results obtained from prior art methods with the practical operation of the present invention illustrated by the succeeding examples.

EXAMPLE 1

A mixture of 400 ml. of benzene, 0.5 g. mole of ethylenimine, 0.5 g. mole of allyl chloride, and 1.0 g. mole of powdered sodium hydroxide was heated to 65° C. and stirred at this temperature for two hours. Samples of the mixture were anlyzed periodically during this time. No reaction took place.

EXAMPLE 2

A reaction mixture of 500 ml. of benzene, 85.1 g. of powdered sodium hydroxide, 45.8 g. of ethylenimine and 78.6 g. of allyl chloride was pressured under 300 p.s.i.g. nitrogen in a 1.4 liter stainless steel bomb agitated by a rocker mechanism. The bomb was heated to 125° C. in a four hour period and this temperature was maintained for another two hours. After cooling, the bomb was opened and the contents were examined. High-boiling byproducts and polymeric residue were found, but there was no evidence of N-allylaziridine.

EXAMPLE 3

A one liter flask equipped with thermometer, stirrer, and reflux condenser served as the reactor for a mixture of 300 ml. of nitrobenzene, 84.4 g. of powdered sodium hydroxide, 43.2 g. of ethylenimine, 78.6 g. of allyl chloride, and 20 g. of n-heptane, this last ingredient being used as an internal standard for vapor phase chromatographic analysis. The mixture was allowed to react while being stirred at 23–30° C. Weighed samples of the reaction mixture were withdrawn periodically and analyzed in a vapor phase chromatography apparatus. Results are shown in Table I. Yields of N-allylaziridine are calculated on the basis of allyl chloride disappearing.

Table I

| Time, Hours | Percent Conversion of Allyl Chloride | Percent Yield of N-Allyl-aziridine |
|---|---|---|
| 1.1 | 11.2 | 95.8 |
| 2.7 | 29.1 | 75.4 |
| 5.4 | 49.9 | 63.9 |
| 12.6 | 75.7 | 53.3 |
| 23.8 | 89.2 | 47.0 |

EXAMPLE 4

A mixture containing the same reactants in the proportions shown in Example 3 was reacted according to the procedure of that example but at a temperature of 46°–50° C. The progress of the reaction is shown by the data in Table II.

Table II

| Time, Hours | Percent Conversion of Allyl Chloride | Percent Yield of N-Allyl-aziridine |
|---|---|---|
| 0.9 | 38.9 | 78.0 |
| 1.4 | 52.3 | 66.0 |
| 2.5 | 70.1 | 54.2 |
| 3.9 | 83.2 | 46.7 |
| 7.2 | 94.0 | 43.2 |

EXAMPLE 5

The procedure of Examples 3 and 4 was repeated except for using 2.0 g. moles of ethylenimine per g. mole of allyl chloride. The temperature was 41–45° C.

Table III

| Time, Hours | Percent Conversion of Allyl Chloride | Percent Yield of N-Allyl-aziridine |
|---|---|---|
| 0.8 | 48.8 | 85.3 |
| 1.25 | 69.2 | 79.4 |
| 2.9 | 94.3 | 70.6 |
| 5.8 | 99.5 | 69.2 |

EXAMPLE 6

The procedure of Examples 3–5 was repeated using 2.1 g. moles of ethylenimine to 0.7 g. mole of allyl chloride and conducting the experiment at 42–47° C. The results obtained are summarized in Table IV.

Table IV

| Time, Hours | Percent Conversion of Allyl Chloride | Percent Yield of N-Allyl-aziridine |
|---|---|---|
| 0.6 | 59.1 | 85.5 |
| 1.0 | 75.5 | 81.1 |
| 2.0 | 94.4 | 78.7 |
| 3.5 | 99.5 | 73.5 |

EXAMPLE 7

A mixture of 300 ml. of nitrobenzene, 250 g. of tetramethylguanidine, 42.8 g. of ethylenimine, and 78.6 g. of allyl chloride was stirred for two days at 23–26° C. At this time the allyl chloride had been completely converted. The reaction mixture was filtered to remove precipitated tetramethylguanidine hydrochloride, a few grams of sodium hydroxide was added to the filtrate, and the product was separated by distillation under reduced pressure. A yield of 36.0 g. of N-allylaziridine was obtained.

EXAMPLE 8

By a procedure similar to that used in the foregoing examples, a mixture of 300 ml. of nitrobenzene, 84.4 g. pwodered sodium hydroxide, 86.8 g. of ethylenimine, and 90.5 g. of methallyl chloride was stirred for about three hours at 43–50° C. The reaction mixture was worked up as in Example 7 to obtain a 77.0% yield of N-methallylaziridine based on 100% conversion of the starting chloride.

EXAMPLES 9–10

In the manner edscribed above, two experiments were run, in each of which 1.0 g. mole of ethylenimine was reacted with 0.5 g. mole of allyl chloride and 1.25 g. moles of powdered sidium hydroxide for about 4.5 hours at 43–45° C. using 200 ml. of acetonitrile and dimethylformamide respectively as reaction solvents. In each case the yield of N-allylaziridine produced was 52% of the theoretical, based on 100% conversion of the allyl chloride.

EXAMPLE 11

A 500 ml. reaction flask containing 250 g. of 20% aqueous sodium hydroxide, 43.4 of ethylenimine, and 39.3 g. of allyl chloride was put in a water bath and the reaction mixture was heated to 45° C. in twenty minutes while being stirred. Stirring was continued for 7.5 hrs. at 42–45° C., at the end of which time the allyl chloride was completely reacted. The mixture was then cooled and the organic layer was worked up as before to obtain a 31.0% yield of N-allylaziridine based on the starting allyl chloride.

According to the general procedure shown in Examples 3–11, other allylic halides such as allyl bromide, methallyl iodide, ethallyl chloride, and related halides as previously defined are reacted with aziridines to obtain the corresponding N-substituted compound. As the aziridine reactant, such substituted ethylenimines as 2-methylaziridine, 2,3-dimethylaziridine; 2-cyclohexylaziridine, 2-phenylaziridine, 2-benzyl-3-ethylaziridine, and other such compounds containing an aziridine ring having an unsubstituted nitrogen atom can be used in the place of ethylenimine in the above examples with similar results.

These N-substituted aziridines are useful as intermediates in chemical synthesis and as monomers for the preparation of polymeric products. Of particular interest are homopolymers of N-allylaziridines of the formula

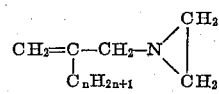

where n is zero to two.

These aziridines can be homopolymerized in either of two ways depending upon the type of polymerization catalyst used. By contacting these compounds with a catalyst capable of polymerizing an allyl compound, for example, an organic or inorganic peroxide catalyst, polymerization through the olefinic bond of the allylic group can be initiated to produce homopolymers having reactive ethylenimine substituents. By carrying out this type of polymerization under conditions such that the acid-sensitive aziridine ring is unaffected, homopolymers wherein the aziridine ring is essentially unpolymerized are obtained. Such homopolymers are useful chiefly as intermediate polymers which can be further polymerized through the aziridine ring substituents to make cross-linked solid polymers as molded or shaped articles.

Intermediate polymers of another class are made by contacting these N-allylaziridines with an acid or acidic salt capable of opening the aziridine ring, thereby producing polyethyleneamines having allylic substituents attached to the nitrogen atoms.

These polymers consist essentially of recurring units having the structure

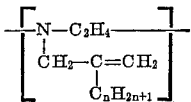

Such homopolymers are viscous, water-soluble liquids which are useful as tire cord adhesives and as curing agents for epoxy resins. The allyl substituents can be further reacted as described above to make solid cross-linked resins which are useful bonding agents and which can also be molded as desired.

EXAMPLE 12

A mixture of 35 g. of water, 20.0 g. of N-allylaziridine, and 0.4 g. of HCl (added as dilute hydrochloric acid) was stirred together in a polymerization bottle at ice temperature. The bottle was then removed from the ice bath, allowed to warm to 4–5° C., and sealed. The sealed bottle was heated at 90–92° C. for 30 minutes, thereby converting about 99% of the N-allylaziridine to a homopolymer. The aqueous product was a light yellow solution. Removal of the water under reduced pressure yielded the polymer product as a viscous yellow liquid. The viscosity of a 1% by weight aqueous solution of the product was 1.32 centistokes at 25° C. This polymer was a polyethyleneamine consisting essentially of recurring units of the formula

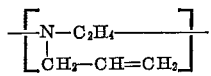

Results similar to those shown in Example 12 were obtained when the above procedure was repeated using more dilute solutions of N-allylaziridine and concentrations of HCl of 1–3%, based on the aziridine. Slightly longer reaction times were necessary for complete polymerization as the proportion of water was increased.

In the same way, N-methallylaziridine and N-ethallylaziridine are polymerized to obtain products of similar properties.

I claim:
1. A homopolymer of an aziridine of the formula

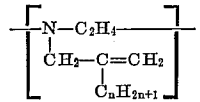

wherein $n$ is an integer from zero to two inclusive.

2. The homopolymer of claim 1 wherein said homopolymer consists essentially of recurring structural units of the formula

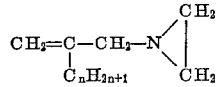

3. The homopolymer of claim 2 wherein $n$ is zero.

References Cited by the Examiner
UNITED STATES PATENTS

| | | | |
|---|---|---|---|
| 2,269,997 | 1/1942 | Berchet | 260—2 |
| 2,312,863 | 3/1943 | Bestian | 260—2 |
| 2,368,082 | 1/1945 | Ulrich | 260—239 |
| 2,654,737 | 10/1953 | Bestian | 260—239 |

NICHOLAS S. RIZZO, *Primary Examiner.*